US011287027B2

(12) United States Patent
Davies

(10) Patent No.: US 11,287,027 B2
(45) Date of Patent: Mar. 29, 2022

(54) LUBRICATION SYSTEM FOR BALLSCREW ACTUATOR

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 60 days.

(21) Appl. No.: 16/715,020

(22) Filed: Dec. 16, 2019

(65) Prior Publication Data
US 2020/0332885 A1  Oct. 22, 2020

(30) Foreign Application Priority Data

Apr. 18, 2019  (EP) .................................. 19275057.8

(51) Int. Cl.
*F16H 57/04* (2010.01)
*F16H 25/22* (2006.01)
*F16H 25/24* (2006.01)

(52) U.S. Cl.
CPC ..... *F16H 57/0497* (2013.01); *F16H 25/2285* (2013.01); *F16H 25/2418* (2013.01)

(58) Field of Classification Search
CPC ............ F16H 57/0497; F16H 25/2285; F16H 25/2418
See application file for complete search history.

(56) References Cited

U.S. PATENT DOCUMENTS

| 4,053,167 A * | 10/1977 | Jelinek ................. F16H 25/2418 277/354 |
| 6,401,557 B1 * | 6/2002 | Davies .................... F02K 1/763 192/141 |
| 6,941,831 B2 | 9/2005 | Ohkubo |
| 7,278,333 B2 | 10/2007 | Kato et al. |
| 8,051,730 B2 | 11/2011 | Jiang et al. |

(Continued)

FOREIGN PATENT DOCUMENTS

| EP | 3447335 A1 | 2/2019 |
| JP | 2003083418 A | 3/2003 |

(Continued)

OTHER PUBLICATIONS

European Search Report for Application No. 19275057.8, dated May 27, 2019, 7 pages.

*Primary Examiner* — Terence Boes
(74) *Attorney, Agent, or Firm* — Cantor Colburn LLP

(57) ABSTRACT

A ballscrew assembly comprises a ballnut having a first helical groove and a ballscrew comprising a second helical groove opposed to the first helical groove so as to form a helical raceway. A plurality of balls is disposed in the helical raceway. A first seal is disposed at a first axial end of the ballnut to seal between the ballscrew and the ballnut. A second seal is provided for selectively sealing between the ballscrew and a second axial end of the ballnut, the second seal comprising a ballscrew seal mounted for axial movement with the ballscrew, and configured to make sealing engagement with the ballnut when the ballscrew is in a first axial position relative to the ballnut to form a chamber between the first and second seals, but not to make sealing engagement with the ballnut when the ballscrew assembly is in a second axial position relative thereto.

15 Claims, 2 Drawing Sheets

(56) References Cited

U.S. PATENT DOCUMENTS

| | | | |
|---|---|---|---|
| 9,568,077 B2 | 2/2017 | Jacob et al. | |
| 9,708,053 B2 | 7/2017 | Curlier et al. | |
| 2002/0144560 A1* | 10/2002 | Yatsushiro | F16H 25/2418 |
| | | | 74/89.4 |
| 2006/0076214 A1* | 4/2006 | Yang | F16H 25/2418 |
| | | | 198/468.9 |

FOREIGN PATENT DOCUMENTS

| | | | | |
|---|---|---|---|---|
| JP | 2004068988 A | * | 3/2004 | F16H 25/2418 |
| JP | 2007232051 A | | 9/2007 | |

* cited by examiner

LUBRICATION SYSTEM FOR BALLSCREW ACTUATOR

FOREIGN PRIORITY

This application claims priority to European Patent Application No. 19275057.8 filed Apr. 18, 2019, the entire contents of which is incorporated herein by reference.

TECHNICAL FIELD

The present disclosure relates to ballscrew actuators, and in particular to seals for ballscrew actuators.

BACKGROUND

Ballscrew actuators are used to translate a rotational input into an axial displacement with minimal friction losses. Ballscrew actuators are used in a variety of applications, including in aircraft and aircraft engines.

Ballscrew actuators are generally lubricated in order to facilitate relative motion between a screw, nut and balls. It is desirable to seal the ballscrew actuator in such a way as to prevent the lubricant leaking, thereby to maximise the period between reapplications of the lubricant. It is desirable to apply the lubricant to the actuator in an effective manner to ensure lubrication of all contact surfaces within the ballscrew.

SUMMARY

According to a first aspect of the present disclosure, there is provided a ballscrew assembly comprising a ballnut having a first helical groove formed on a radially inner surface and defining an axis and a ballscrew disposed along the axis within the ballnut. The ballscrew comprises a second helical groove formed on a radially outer surface and opposed to the first helical groove so as to form a helical raceway. A plurality of balls is disposed in the helical raceway. A first seal is disposed at a first axial end of the ballnut to seal between the ballscrew and the ballnut. A second seal is also provided for selectively sealing between the ballscrew and a second axial end of the ballnut. The second seal comprises a ballscrew seal mounted for axial movement with the ballscrew, and configured to make sealing engagement with the ballnut when the ballscrew is in a first axial position relative to the ballnut to form a chamber between the first and second seals, but not to make sealing engagement with the ballnut when the ballscrew assembly is in a second axial position relative thereto.

The first seal may comprise a vent passage formed therethrough for venting the chamber.

The ballscrew seal may comprise a seal mounted on a radially outer portion of the ballscrew, a radially outer portion of the seal sealingly engaging a radially inner portion of the ballnut in the first axial position.

The seal may comprise a radially projecting section for engaging the ballnut.

The radially projecting section may be at an axial end of the seal.

At least the part of the ballscrew seal which makes sealing contact with the ballnut may be formed of a corrosion resistant steel.

The ballnut may comprise a ballnut seal for making sealing engagement with the ballscrew seal in the first axial position.

The ballnut seal may comprise a seal which is radially spaced from the ballscrew in the second axial position of the ballscrew assembly.

The ballnut seal may be received in an annular groove formed on a radially inner surface of the ballnut.

The ballnut may further comprise a passage opening into the annular groove for supplying lubricant to the annular groove.

The ballnut seal may be formed of a polymer compound.

The first seal may be formed of a polymer compound.

The first axial position of the ballscrew relative to the ballnut may be a fully extended condition of the ballscrew assembly.

According to a further aspect of the present disclosure, the is provided a method of lubricating a ballscrew assembly according to any of the above embodiments, comprising the steps of moving the ballscrew to its first axial position relative to the ballnut so as to seal the second axial end of the ballnut, and injecting a lubricant into the chamber.

Lubricant may be injected into the chamber until excess lubricant passes through a or the vent in the first seal.

BRIEF DESCRIPTION OF THE DRAWINGS

An embodiment of the present disclosure will now be described by way of example only, and with reference to the following drawings in which.

DETAILED DESCRIPTION

Figure 1:
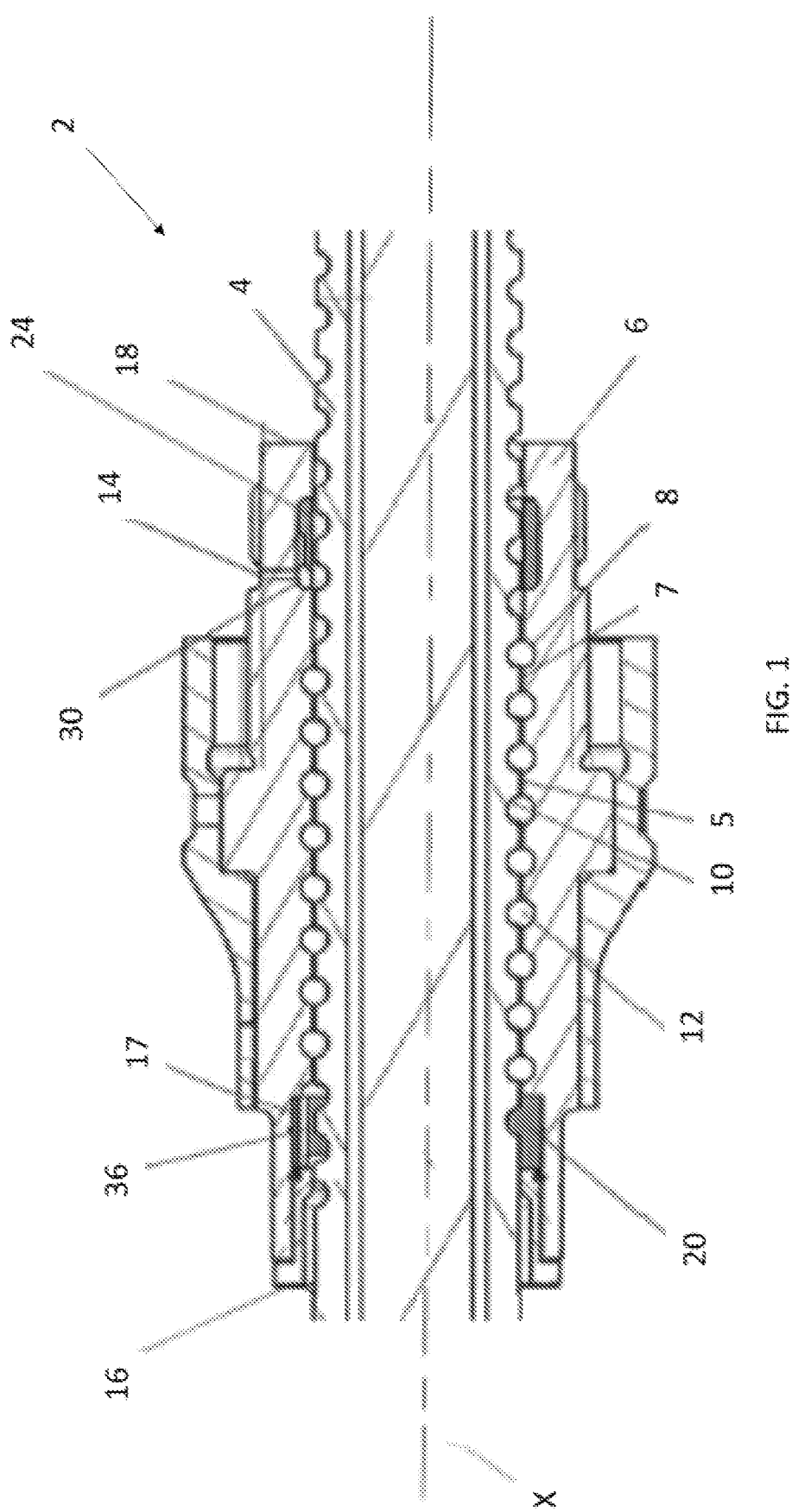
FIG. 1 shows a partial view of a ballscrew assembly according to one embodiment in a stowed state.

FIG. 1 shows a ballscrew actuator assembly 2 in an undeployed (stowed) state. The ballscrew assembly 2 comprises a ballscrew 4, a ballnut 6 and a plurality of balls (not shown). The ballscrew 4 and ballnut 6 share a longitudinal axis X. The ballscrew 4 comprises a radially outer surface 5 on which a helical groove 8 is formed. The ballnut 6 comprises a radially inner surface 7 facing the radially outer surface 5 of the ballscrew, on which an opposed helical groove 10 is formed. The helical grooves 8 and 10 cooperate to form a helical raceway 12 in which the plurality of balls are located.

The ballscrew 4 and ballnut 6 can rotate relative to one another, supported on the plurality of balls. Relative rotation of the ballscrew 4 and ballnut 6 produces a corresponding axial movement of the ballscrew 4 and ballnut 6 relative to one another along the axis X. Either one of the ballscrew 4 or the ballnut 6 may be rotated while the other is held static in order to produce axial movement, or both may be rotated in opposite directions.

The axial movement of the ballscrew 4 and ballnut 6 actuates a movement of an external component (not shown). In the embodiment shown, the external component is connected to the ballscrew 4.

Figure 2:
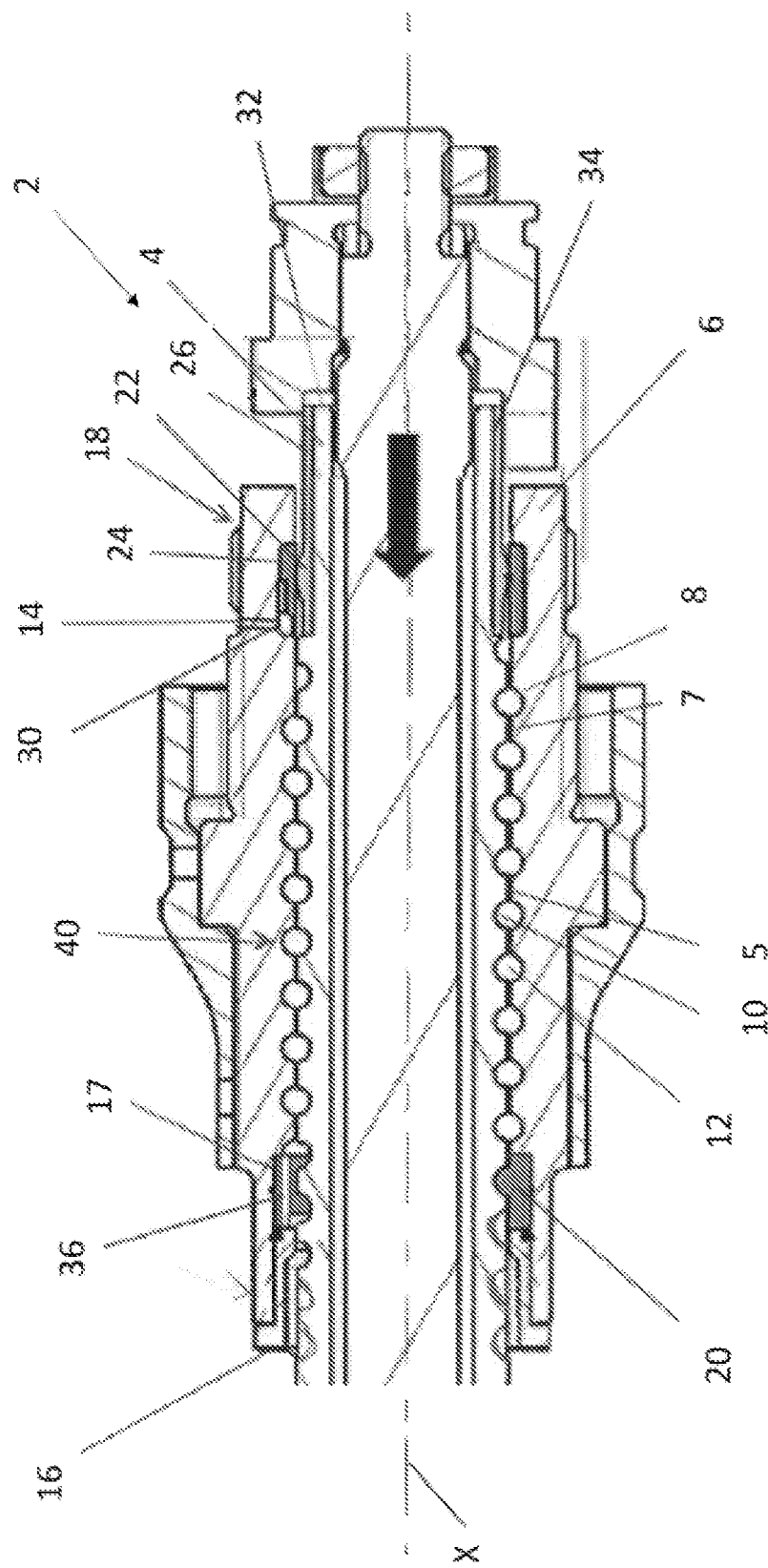
FIG. 2 shows a partial view of the ballscrew assembly of FIG. 1 in a deployed state.

The ballnut 6 comprises a pair of opposed axial ends, an outboard, or first, end 16 and an inboard, or second, end 18. Herein, the term 'outboard' means in the axial direction towards the external environment, and the term 'inboard' means in the axial direction towards the actuator. In FIGS. 1 and 2 the outboard direction is to the left of the Figure, and the inboard direction is to the right of the Figure.

In order to minimise losses in the ballscrew assembly 2 from friction between the ballscrew 4, ballnut 6 and the plurality of balls, lubricant is applied to the helical raceway 12 and the plurality of balls therein. The lubricant may be a grease lubricant.

Lubricant leaks from the ballscrew assembly 2 during use, and must be reapplied. It is desirable to minimise the leaking from the ballscrew assembly 2 in order to minimise the period between reapplications. It is also desirable to apply lubricant effectively throughout the helical raceway 12 when reapplication is necessary.

Lubricant may be applied while the ballscrew assembly 2 is in a fully-deployed state. Lubricant is applied to ballscrew assembly 2 through a passage 14 formed through the ballnut 6 near the inboard end 18. The passage 14 may also be referred to as a grease port. The grease port 14 passes fully through the ballnut 6 from a radially exterior surface 9 of the ballnut 6 to an annular groove 30 formed on the radially inner surface 7 of the ballnut 6. The grease port 14 thereby fluidly joins the exterior of the ballscrew assembly 2 to the annular groove 30.

A tool (not shown) is used to inject pressurised lubricant into the grease port 14. Pressurised lubricant passes into the annular groove 30. The building pressure of lubricant in the annular groove 30 forces lubricant from the annular groove 30 between the ballscrew 4 and the ballnut 6 into the helical raceway 12. The lubricant is thereby applied to the raceway 12 and the balls therein.

Leakage from the ballscrew assembly 2 can occur at either axial end of the ballnut 6; that is, both at an outboard end 16 and an inboard end 18 of the ballnut 6. It has been found that leakage predominantly occurs at the inboard end, in particular during reapplication, in part due to the pressurisation from the tool. Excessive leakage of lubricant during reapplication can prevent effective reapplication throughout the helical raceway 12. It is therefore desirable to provide means for limiting the lubricant leaking from the ballscrew assembly 2 during reapplication.

To this end, the ballscrew assembly 2 comprises an outboard, or first, seal 20. The outboard seal 20 is disposed at an outboard, or first, axial end of the ballnut 6, received within an annular groove 17 in the ballnut 6 and fixed relative to the ballnut 6. The outboard seal 20 faces radially inwardly from the ballnut 6 towards the ballscrew 4. At least a part of the outboard seal 20 is shaped corresponding to a shape of the helical groove 10. As is known in the art, the outboard seal 20 comprises substantially the same circumferential cross-sectional shape as the space within the helical groove 10 and the outboard seal 20 interfaces with the helical groove 10 to seal between the ballnut 6 and the ballscrew 4 at the helical groove 10. The outboard seal 20 extends around at least one circumference of the ballscrew 4 so as to provide an effective seal in the axial direction.

The interface between the outboard seal 20 and the helical groove 10 of the ballscrew 4 minimises leakage of lubricant from the outboard end 16 of the helical raceway 12. The outboard seal 20 is dynamic, and the ballscrew 4 and corresponding helical groove 8 both contact and move relative to the outboard seal 20. The contact and relative movement induce friction between the ballscrew 4 and the ballnut 6.

The sealing at the first, outboard end 16 limits leakage from that axial end, but does not limit leakage at the inboard end.

To reduce leakage at the inboard end, it might be thought to be advantageous to provide an additional inboard seal with a similar structure to the outboard seal 20. However, this would potentially create a prohibitive amount of friction between the ballscrew 4 and ballnut 6. In some cases, the amount of friction could be so great as to prevent any relative movement of the ballscrew 4 and ballnut 6 at a 'cold' (initial, undeployed) state of the ballscrew assembly 2, thereby preventing any operation of the actuator. Nevertheless, it is desirable to minimise leakage through the inboard end 18 at least during reapplication of lubricant, for the reasons stated above. To this end, in accordance with this disclosure, a seal with a minimal friction effect is provided.

An inboard seal 22 is therefore provided to reduce leakage at the inboard end 18 of the ballnut 6, as best seen in FIG. 2. FIG. 2 shows the ballscrew assembly 2 in a fully-deployed state. The inboard seal 22 comprises a ballscrew seal 26, attached or otherwise secured to the ballscrew 4. In an embodiment, the ballscrew seal 26 may be a sleeve. In an embodiment, the ballscrew seal 26 may be received in an annular groove 34 formed in the ballscrew 4 at an axially inboard end 32 of the ballscrew 4.

In a first axial position of the ballscrew assembly 2, illustrated in FIG. 2, the ballscrew seal 26 sealingly contacts with the ballnut 6 at the axially inboard end 18 of the ballnut 6. The contact may be at a point axially inboard of the grease port 14. The sealing contact between the ballscrew seal 26 and the ballnut 6 limits leakage of lubricant from the ballscrew assembly from the inboard end 18 of the ballnut 6 in the first axial position. In the first axial position, therefore, the outboard seal 20 and the inboard seal 22, comprising the ballscrew seal 26, together form a chamber 40 between the inboard and outboard ends 16, 18 of the ballnut.

In a second axial position of the ballscrew assembly, illustrated in FIG. 1, the ballscrew seal 26 is axially separated from the ballnut 6; that is, the ballscrew seal 26 is axially inboard of the inboard end 18 of the ballnut 6, so that the ballscrew seal 26 is not axially aligned with any portion of the ballnut 6. There is therefore no contact between the ballscrew seal 26 and the ballnut 6.

In the embodiment pictured, the first axial position is the fully deployed position as shown in FIG. 2, and the second axial position is the fully stowed position as shown in FIG. 1.

Reapplication of lubricant is performed while the ballscrew assembly 2 is in the first axial position. Lubricant is passed through the grease port 14 in the manner described above. The inboard seal 22 minimises leakage from the inboard end 18 of the ballnut 6 by the sealing contact of the ballscrew seal 26 with the ballnut 6, as described. Pressurised lubricant is therefore encouraged to pass in the outboard direction between the ballscrew 4 and the ballnut 6, into and along the helical raceway 12. Lubricant is prevented from leaking from the outboard end 16 by the outboard seal 16, as described above. The lubricant is therefore effectively applied throughout the helical raceway 12.

Once reapplication is complete, the ballscrew assembly 2 may be moved towards the second axial position. Once the ballscrew assembly 2 reaches partway between the two axial positions, the ballscrew seal 26 of the inboard seal 22 is no longer in contact with the ballnut 6. There is therefore no friction induced at this point.

The arrangement therefore provides an inboard seal 22 which is active and sealing while the lubricant is reapplied, and which induces minimal friction.

In order to provide an effective seal, the ballscrew seal 26 may comprise a radially projecting portion 28. The radially projecting portion 28 may provide an annular line contact with the ballnut 6. This allows the ballscrew seal 26 to effectively seal to the ballnut 6 while minimising the contact area to reduce friction between the components.

The inboard seal 22 may further comprise a ballnut seal 24, attached or otherwise secured to the ballnut 6. In an embodiment, the ballnut seal 24 is a sleeve. The ballnut seal may be secured within the annular groove 30, if present. The ballnut seal 24 may be located to an inboard end of the annular groove 30, while the grease port 14 is toward an outboard end of the annular groove 30, so that the grease port 14 is not obstructed by the ballnut seal 24.

In the first axial position of the ballscrew assembly, the ballnut seal 24 and the ballscrew seal 26 are at least partially axially aligned, and are in sealing contact with one another. The ballnut seal 24 and the ballscrew seal 26 have a slight geometric interference in the radial direction, which serves to provide a radial compression load between the ballnut seal 24 and the ballscrew 26 when at least partially aligned in the first axial position. If present, the radially projecting portion 28 sealingly contacts with the ballnut seal 24 when the seals 24, 26 are axially aligned. In the second axial position, the ballnut seal 24 and the ballscrew seal 26 are not axially aligned, and do not contact, thereby reducing friction. The ballnut seal 24 is also radially separated from the ballscrew 4 by a small clearance in the second axial position such that they are not in contact, so as not to induce friction therewith during normal operation of the ballscrew assembly 2. It would, however, produce some sealing effect to reduce loss of lubricant from the inboard end during normal function.

Some leakage may occur through the inboard seal 22 during reapplication due to the pressurisation forcing lubricant between the ballscrew seal 26 and the ballnut 6. In order to alleviate this effect, a vent 36 may be provided through the outboard seal 20. The vent 36 passes fully axially through the outboard seal 20. The vent 36 allows a pressure equalisation between inboard and outboard sides of the outboard seal 20. A typical vent size may be in the order of 1-2 mm diameter.

When the pressurised lubricant is passed into the grease port 14, the pressure in the ballscrew assembly 2 between the outboard seal 20 and the inboard seal 22 increases. The vent 36 allows pressure equalisation, creating a lower pressure region near to the outboard seal 20. The pressurised lubricant is thereby encouraged towards the low pressure region, taking the path of least resistance. Once lubricant reaches the outboard seal 14, a small amount may pass through the vent 36 to the exterior of the ballscrew assembly 2.

The effect of the vent prevents lubricant from being forced through the inboard seal 22, because it is instead encouraged towards the outboard seal 20. Additionally, because the grease port 14 is near to the inboard end 18 of the ballnut 6, lubricant passing from the grease port 14 to the vent 36 traverses substantially the full length of the helical groove 10 of the ballnut 6, providing effective reapplication of lubricant. Finally, the vent 36 can be observed for lubricant egress to determine when the reapplication of lubricant is complete.

In an embodiment, the outboard seal 20 may be made of a polymer compound. The soft material allows the outboard seal 20 to be installed in the ballscrew assembly 2 more easily.

In an embodiment, the ballnut seal 24 may similarly be made of a soft polymer compound to similarly allow ease of installation.

In an embodiment, the ballscrew seal 26 may be made at least partially of a steel, for example a corrosion resistant steel (CRES) to provide integrity and durability. The ballscrew seal 26 may be completely formed of the steel, or only a portion, for example the radially projecting portion 28, may be formed of steel, to save weight. The remaining portion of the ballscrew seal may be made of another material such as a soft polymer compound, to aid installation.

The ballscrew assembly 2 could be used as an actuator in aerospace applications, for example as the linear actuator of an aircraft engine thrust reverser. Thrust reverse actuators are required to operate reliably, while having low mass and low maintenance intervals.

It will be understood that the above description is of non-limiting embodiments of the disclosure. Changes and modifications can be made thereto without departing from the scope of the disclosure which is defined by the following claims.

The invention claimed is:

1. A ballscrew assembly comprising:
a ballnut having a first helical groove formed on a radially inner surface and defining an axis (X);
a ballscrew disposed along the axis (X) within the ballnut, the ballscrew comprising a second helical groove formed on a radially outer surface and opposed to the first helical groove so as to form a helical raceway;
a plurality of balls disposed in the helical raceway;
a first seal disposed at a first axial end of the ballnut to seal between the ballscrew and the ballnut; and
a second seal for selectively sealing between the ballscrew and a second axial end of the ballnut, the second seal comprising a ballscrew seal mounted for axial movement with the ballscrew, and configured to make sealing engagement with the ballnut when the ballscrew is in a first axial position relative to the ballnut to form a chamber between the first and second seals, but not to make sealing engagement with the ballnut when the ballscrew assembly is in a second axial position relative thereto.

2. The ballscrew assembly of claim 1, wherein the first seal comprises a vent passage formed therethrough for venting the chamber.

3. The ballscrew assembly of claim 1, wherein the ballscrew seal comprises a seal mounted on a radially outer portion of the ballscrew, a radially outer portion of the seal sealingly engaging a radially inner portion of the ballnut in the first axial position.

4. The ballscrew assembly of claim 3, wherein the seal comprises a radially projecting section for engaging the ballnut.

5. The ballscrew assembly of claim 4, wherein the radially projecting section is at an axial end of the seal.

6. The ballscrew assembly of claim 1, wherein at least the part of the ballscrew seal which makes sealing contact with the ballnut is formed of a corrosion resistant steel.

7. The ballscrew assembly of claim 1, wherein the ballnut comprises a ballnut seal for making sealing engagement with the ballscrew seal in the first axial position.

8. The ballscrew assembly of claim 7, wherein the ballnut seal comprises a seal which is radially spaced from the ballscrew in the second axial position of the ballscrew assembly.

9. The ballscrew assembly of claim 8, wherein the ballnut further comprises a passage opening into an annular groove for supplying lubricant to the annular groove.

10. The ballscrew assembly of claim 7, wherein the ballnut seal is received in an annular groove formed on a radially inner surface of the ballnut.

11. The ballscrew assembly of claim 7, wherein the ballnut seal is formed of a polymer compound.

12. The ballscrew assembly of claim 1, wherein the first seal is formed of a polymer compound.

13. The ballscrew assembly of claim 1, wherein the first axial position of the ballscrew relative to the ballnut is a fully extended condition of the ballscrew assembly.

14. A method of lubricating a ballscrew assembly as claimed in claim 1, comprising the steps of:
   moving the ballscrew to its first axial position relative to the ballnut so as to seal the second axial end of the ballnut; and
   injecting a lubricant into the chamber.

15. The method of claim 14, wherein lubricant is injected into the chamber until excess lubricant passes through the vent in the first seal.

* * * * *